United States Patent
Burke et al.

(10) Patent No.: US 12,054,279 B2
(45) Date of Patent: Aug. 6, 2024

(54) SYSTEMS AND METHODS FOR PRECISE VEHICLE LOCATOR

(71) Applicant: Harris Global Communications, Inc., Rochester, NY (US)

(72) Inventors: Peter Burke, Hilton, NY (US); Richard J. Nink, Melbourne, FL (US); Joel Womack, El Paso, TX (US); Malcolm Packer, Hillsborough, NC (US); Thomas Howe, Rochester, NY (US); Aaron Hendershot, Webster, NY (US)

(73) Assignee: HARRIS GLOBAL COMMUNICATIONS, INC., Rochester, NY (US)

( * ) Notice: Subject to any disclaimer, the term of this patent is extended or adjusted under 35 U.S.C. 154(b) by 381 days.

(21) Appl. No.: 17/665,018

(22) Filed: Feb. 4, 2022

(65) Prior Publication Data
US 2023/0249841 A1    Aug. 10, 2023

(51) Int. Cl.
*B64D 41/00*    (2006.01)
*B64D 9/00*    (2006.01)
(Continued)

(52) U.S. Cl.
CPC .............. *B64D 41/00* (2013.01); *B64D 9/00* (2013.01); *B64U 50/30* (2023.01); *G08G 5/0026* (2013.01);
(Continued)

(58) Field of Classification Search
CPC ...... B64D 41/00; B64D 9/00; B64D 2221/00; B64D 2045/0065; G08G 5/0026;
(Continued)

(56) References Cited

U.S. PATENT DOCUMENTS

| | | | |
|---|---|---|---|
| 9,738,398 B1 * | 8/2017 | Wang | G01S 1/725 |
| 2003/0093187 A1 * | 5/2003 | Walker | B64D 45/0059 |
| | | | 701/1 |

(Continued)

FOREIGN PATENT DOCUMENTS

| | | |
|---|---|---|
| AU | 2018331310 B2 | 4/2021 |
| CA | 2579777 | 7/2016 |
| WO | 2011156706 A1 | 12/2011 |

OTHER PUBLICATIONS

Li, Xiangyu et al. "Gradient-Based UAV Positioning Algorithm for Throughput Optimization in UAV Relay Networks." ICC 2019 (2019).

(Continued)

*Primary Examiner* — Donald J Wallace
*Assistant Examiner* — Jalal C Coduroglu
(74) *Attorney, Agent, or Firm* — Fox Rothschild LLP; Carol Thorstad-Forsyth

(57) ABSTRACT

Systems and methods for locating UAV. The methods comprise: causing a physical joining of a payload with a fuselage of the UAV without any modification to the fuselage (where the payload comprises a communication relay configured to perform relay operations to extend a range between users of a communication relay link for voice and data communications and a first locator configured to perform location operations to determine and report a location of the UAV to the users of the communication relay link); using a power source to supply power to the payload that is independent from a main power source used to supply power to avionic electronics of the UAV; and continuing to perform the relay operations by the communication relay and the location operations by the first locator, when power is no longer being supplied to the avionic electronics by the main power source of the UAV.

20 Claims, 9 Drawing Sheets

(51) Int. Cl.
*B64D 45/00* (2006.01)
*B64U 50/30* (2023.01)
*B64U 101/20* (2023.01)
*B64U 101/64* (2023.01)
*G08G 5/00* (2006.01)
*H04B 7/185* (2006.01)

(52) U.S. Cl.
CPC . *H04B 7/18504* (2013.01); *B64D 2045/0065* (2013.01); *B64D 2221/00* (2013.01); *B64U 2101/20* (2023.01); *B64U 2101/64* (2023.01)

(58) Field of Classification Search
CPC ............... H04B 7/18504; B64U 50/30; B64U 2101/20; B64U 2101/64
See application file for complete search history.

(56) References Cited

U.S. PATENT DOCUMENTS

| | | | | |
|---|---|---|---|---|
| 2004/0008253 | A1* | 1/2004 | Monroe | H04B 7/18506 348/E7.086 |
| 2012/0200460 | A1* | 8/2012 | Weed | G01S 1/022 342/385 |
| 2014/0183300 | A1 | 7/2014 | MacCulloch et al. | |
| 2017/0257165 | A1* | 9/2017 | Pescod | H04B 10/2575 |
| 2017/0337813 | A1* | 11/2017 | Taylor | G05D 1/0285 |
| 2018/0024555 | A1 | 1/2018 | Parks et al. | |
| 2018/0101169 | A1* | 4/2018 | Applewhite | B64C 39/024 |
| 2020/0031437 | A1* | 1/2020 | Moses | B64D 47/08 |
| 2020/0031438 | A1* | 1/2020 | Moses | G01S 5/0231 |
| 2020/0120458 | A1* | 4/2020 | Aldana | H04W 72/23 |
| 2020/0280827 | A1* | 9/2020 | Fechtel | H04W 4/40 |

OTHER PUBLICATIONS

K. Ikeda, F. Ono, H. Ochiai and R. Miura, "A Virtual MIMO Relay System with Unmanned Aircraft and Multiple Ground Stations," 2014 IEEE 80th Vehicular Technology Conference (VTC2014-Fall), 2014, pp. 1-5, doi: 10.1109/VTCFall.2014.6965849.

J. Keller, B. Deng, D. Gore and J. Minnix, "Effective Non-Cooperative Surveillance for UAS Situational Awareness," 2020 Integrated Communications Navigation and Surveillance Conference (ICNS), 2020, pp. 2E2-1-2E2-10, doi: 10.1109/ICNS50378.2020.9222908.

* cited by examiner

US 12,054,279 B2

SYSTEMS AND METHODS FOR PRECISE VEHICLE LOCATOR

BACKGROUND

Statement of the Technical Field

The present document concerns vehicle location systems. More specifically, the present document concerns systems and methods for precise vehicle locators.

Description of the Related Art

Many ground radios exist for facilitating voice and data communications between users. A clear Line of Sight (LoS) between two radios is ideal for such communications, but impractical in many applications. For example, the radios may experience Line of Sight (LoS) obstructions effecting the reliability of wireless communications therebetween. The obstructions include distance, terrain (e.g., foliage and mountains) and human made objects (e.g., buildings).

SUMMARY

This document concerns systems and methods for operating and/or locating a UAV. The methods comprises: causing a physical joining of a payload with a fuselage of the UAV without any modification to the fuselage (where the payload comprising a communication relay configured to perform relay operations to extend a range between users of a communication relay link for voice and data communications and a first locator configured to perform location operations to determine and report a location of the UAV to the users of the communication relay link); using a power source to supply power to the payload that is independent from a main power source used to supply power to avionic electronics of the UAV; and continuing to perform the relay operations by the communication relay and the location operations by the first locator, when power is no longer being supplied to the avionic electronics by the main power source of the UAV.

In some scenarios, the payload is physically joined with the fuselage via a compression fit or a frictional fit in a cavity (compartment or bay) of the UAV. Foam may be used to physically join the payload with the fuselage. The foam may also be used to protect the payload from damage due to shock and vibration. The antenna of the communication relay resides outside of the fuselage when the payload is physically joined with the fuselage.

In those or other scenarios, an antenna of the first locator is used as a counterbalance to correct the center of gravity. The antenna of the first locator is attached to an exterior surface of the fuselage without any modification to the fuselage (e.g., via Velcro or double-sided tape).

In those or other scenarios, operations are performed by a second locator of the avionic electronics to detect and report the location of the unmanned aerial vehicle to a ground control station while the main power source is supplying power to the avionic electronics and while the first locator is reporting the location of the unmanned aerial vehicle to the users of the communication relay link. These operations are discontinued by the second locator when power is no longer being supplied to the avionic electronics by the main power source of the unmanned aerial vehicle.

The present document also concerns UAVs. The UAVs comprise: a fuselage; avionic electronics disposed in the fuselage; a payload physical joined with the fuselage without any modification to the fuselage, a first power source configured to supply power to the avionic electronics, and a second power source configured to supply power to the payload, the second power source being separate and apart from the main power source. The payload comprises a communication relay configured to perform relay operations to extend a range between users of a communication relay link for voice and data communications, and a first locator configured to perform location operations to determine and report a location of the unmanned aerial vehicle to the users of the communication relay link. The relay operations and the location operations continue to be performed by the payload when power is no longer being supplied to the avionic electronics by the main power source.

The payload may be physically joined with the fuselage via a compression fit or a frictional fit in a cavity of the unmanned aerial vehicle. Foam may be used to physically join the payload with the fuselage without any modification to the fuselage and/or to protect the payload from damage due to shock and vibration. An antenna of the communication relay resides outside of the fuselage when the payload is physically joined with the fuselage.

An antenna of the first locator may be used as a counterbalance to correct a center of gravity of the unmanned aerial vehicle. The antenna of the first locator is attached to an exterior surface of the fuselage without any modification to the fuselage (e.g., via Velcro or double-sided tape).

The avionic electronics can comprise a second locator configured to detect and report the location of the unmanned aerial vehicle to a ground control station while the main power source is supplying power to the avionic electronics and while the first locator is reporting the location of the unmanned aerial vehicle to the users of the communication relay link. The second locator may discontinue performance of the operations when power is no longer being supplied to the avionic electronics by the main power source of the unmanned aerial vehicle. The unmanned aerial vehicle may be sized and shaped to fit inside a bag that can be carried by an individual.

BRIEF DESCRIPTION OF THE DRAWINGS

This disclosure is facilitated by reference to the following drawing figures, in which like numerals represent like items throughout the figures.

DETAILED DESCRIPTION

Figure 1:
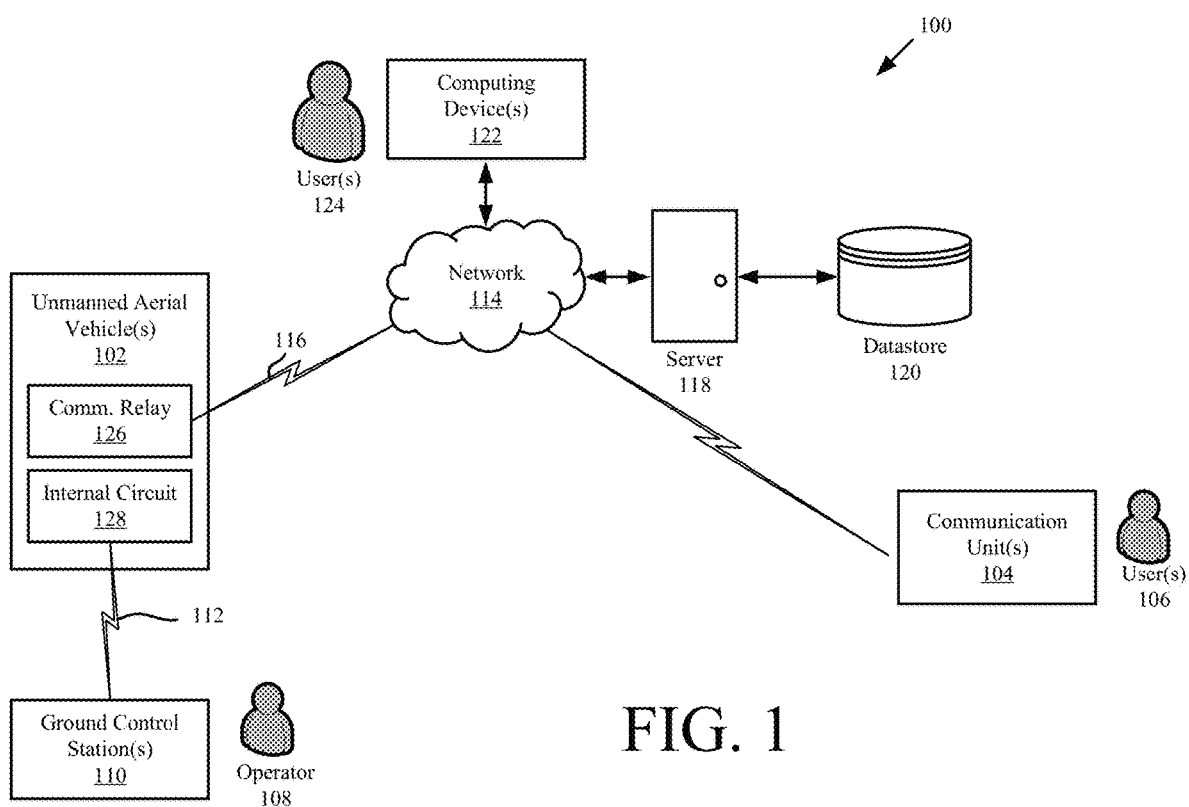
FIG. 1 provides an illustration of a system.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Many ground radios exist for facilitating voice and data communications between users. A clear Line of Sight (LoS) between two radios is ideal for such communications, but impractical in many applications. For example, the radios may experience Line of Sight (LoS) obstructions effecting the reliability of wireless communications therebetween. The obstructions include distance, terrain (e.g., foliage and mountains) and human made objects (e.g., buildings). Thus, there is a need for a solution to improve the reliability of wireless communications between radios when they do not have clear LoS to each other.

The present solution addresses the reliability issue by providing communication relays hosted by UAVs to extend the dismounted communication distances between the radios. The communication relays are designed such that the size, weight and power limitations of the UAVs are satisfied even when the communication relays are disposed therein. This is the case even in scenarios where the UAVs comprise Group 1 Small Unmanned Aircraft Systems (SUASs). A Group 1 SUAS comprises a back-packable UAV that can be used for Intelligence, Surveillance and Reconnaissance (ISR). The communication relays are disposed in the UAVs without any modifications to the UAVs' physical structures, and may support various waveforms (e.g., an Adaptive Networking Wideband Waveform (ANW2®C) and Tactical Networking Waveform (TNW)).

The communication relays of the present are each provided with a locator (e.g., a Global Positioning System (GPS) locator) which is powered by a power source other than the UAV's main power source. In effect, the communication relays facilitate one's ability to locate the UAVs relatively quickly and efficiently when the UAVs crash due to their loss of main power (e.g., unintentionally).

In this regard, it should be appreciated that currently when a Group 1 SUAS is lost, a large search team is required to search a given geographical area. The Group 1 SUAS does have a GPS receiver onboard, but the GPS receiver typically provides poor resolution for receiving the downed aircraft largely due to the last GPS location occurring when the aircraft was still in flight and potentially thousands of feet above and miles from the impact site. If the aircraft contains classified information and/or equipment, then it must be found prior to an adverse entity. The present solution provides a means to quickly locate a downed aircraft, thereby decreasing the likelihood that the aircraft will be first found by the adverse party.

The locator of the communication relay also facilitates: the provision of additional Situational Awareness (SA) to UAV operators and other network users since they can now see locations of the UAVs using web applications. The locator is independent from the UAV's positioning system and navigation bus, which eliminates the possibility of corrupting aircraft control methods and provides redundant position data for the aircraft. The communication relay includes a power source so that it is independent from the UAV's power bus. This allows the communication relay and locator to continue operation after the UAV crashes and/or loses power. By providing a power source with the communication relay, the positioning system will not impact the UAV's battery flight time. The locator is mounted above the UAV's fuselage after performing a pre-flight balance check on the aircraft and functions as a counterbalance to correct the UAV's Center of Gravity (CoG). The locator is mounted in such a way that ensures the UAV's fuselage is not modified (e.g., using double sided Velcro or adhesive tape).

Referring now to FIG. 1, there is provided an illustration of a system 100 implementing the present solution. System 100 comprises a plurality of UAV(s) 102, communication device(s) 104, 122, ground control station(s) 110, and/or a server 118. The UAV 102 does not have any onboard human pilot, crew members and/or passengers. The UAV can include, but is not limited to, an autonomous aerial vehicle and/or a remotely-piloted aerial vehicle. In the remotely-piloted scenarios, an operator 108 (e.g., a Remote Pilot In Command (RPIC)) can remotely control flight operations of the UAV by using ground control station 110 that is communicatively coupled to an internal circuit 128 of the UAV 102 via command and control link 112. The internal circuit 128 includes the avionics payload. The avionics payload comprises avionic electronics, i.e., hardware and/or software facilitating positioning, navigation, timing and other functionalities of the UAV. The UAV can have any classification (e.g., a Group 1-5 classification, and/or size classification (e.g., very small, small, medium, and/or large).

During flight, the UAV 102 can act as an airborne relay to wirelessly connect to communication unit(s) 104 (e.g., terrestrial radios) located on the ground at locations in which wireless communications therefrom are masked or screened by the LoS obstructions (e.g., distance, terrain (e.g., foliage and mountains) and human made objects (e.g., buildings)). In this regard, a communications relay 126 is provided with the UAV. The communications relay 126 may communicate over a secure communications link 116 (e.g., a Small Secure Data Link (SSDL)), use various frequency bands (e.g., Ultra High Frequency (UHF) and Very Hight Frequency (VHF) bands), support a variety of frequencies and waveforms, and extend the range between users 106 for voice and data communications (e.g., text messages and/or imagery data) beyond the LoS range of the communication unit(s) 104. The communication unit(s) 104 can include, but is(are) not limited to, radio transceiver(s), personal computer(s), portable computer(s), desktop computer(s), smart device(s) (e.g., a smart phone), tablet(s), and/or wearable device(s) (e.g., a smart watch and/or smart goggles).

The voice and data communications may be provided to remote devices such as computing device(s) 122 and/or server(s) 118 via network 114. Network 114 can include, but is not limited to, a radio network, a cellular network, and/or the Internet. The remote devices can process and/or output the voice and data communications to users 124 thereof. The voice communications, data communications and/or analytics relating thereto can be stored in a datastore 120.

Figure 2:
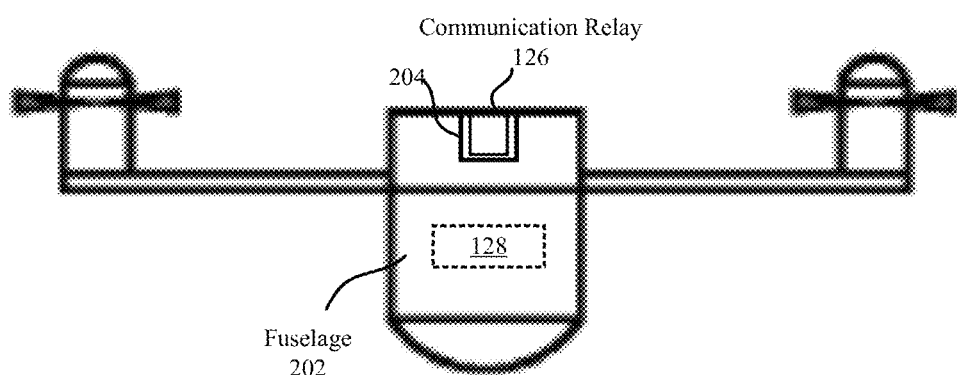
FIG. 2 provides an illustration of the Unmanned Aerial Vehicle (UAV) shown in FIG. 1.

Referring now to FIG. 2, there is shown an illustrative architecture for the UAV 102 of FIG. 1. The internal circuit 128 is disposed inside the fuselage 202 of the UAV, and the communication relay 126 is disposed in an existing compartment 204 formed in the fuselage 202 of the UAV. The compartment 204 is accessible from the outside of the aircraft (e.g., via a door or removable panel). A more detailed block diagram of the internal circuit 128 and communication relay 126 is provided in FIG. 3.

Figure 3:
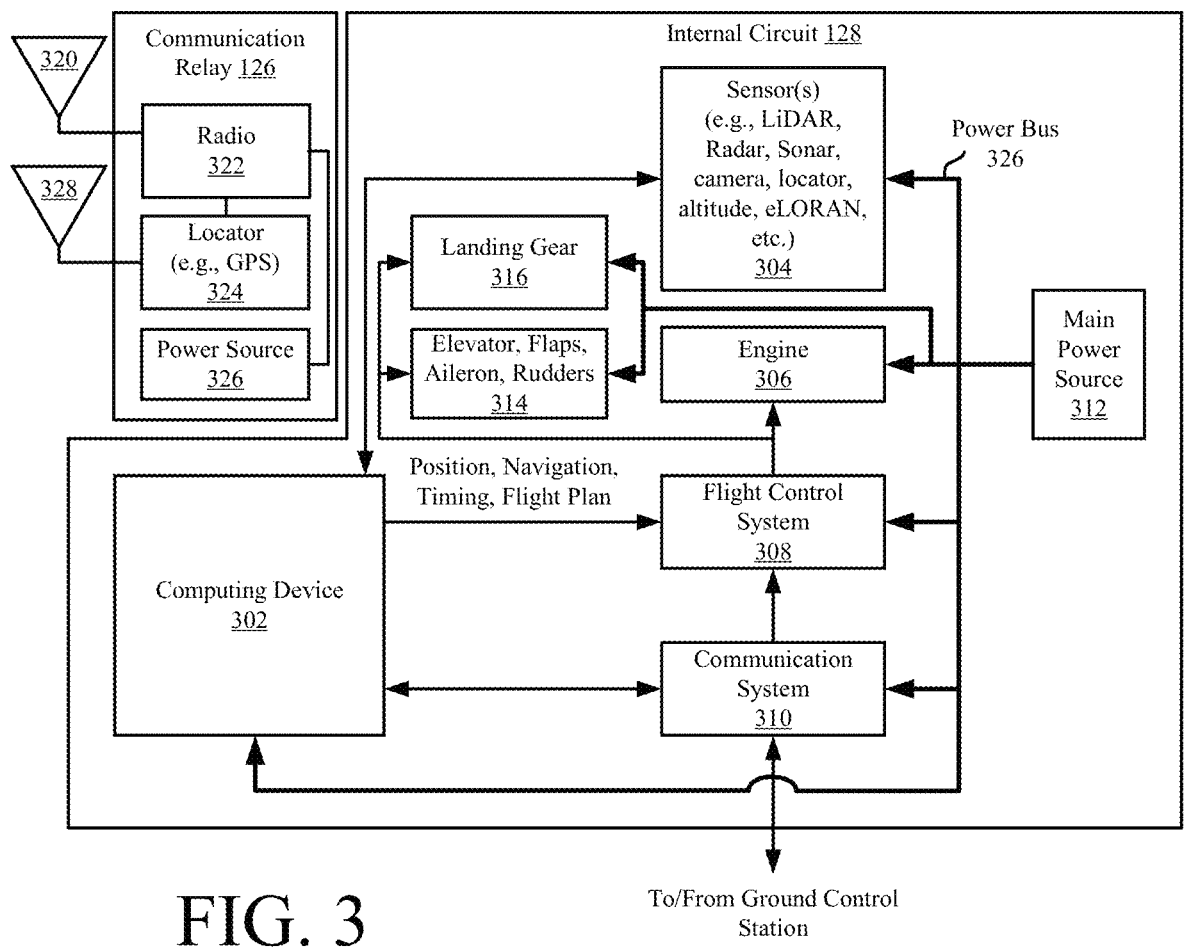
FIG. 3 provides an illustration of electronic components and/or circuits of the UAV shown in FIGS. 1-2.

As shown in FIG. 3, the internal circuit 128 comprises a computing device 302, sensor(s) 304, an engine 306, a flight control system 308, a communication system 310, a power source 312, elevators/flaps/ailerons/rudders 314, and landing gear 316. The internal circuit 128 can include more or less components than those shown and listed.

The computing device 302 comprises processor(s) that execute(s) instructions to perform the at least the following operations: receiving and processing Position, Navigation and Timing (PNT) data from the sensor(s) 304; and/or facilitating flight operations by providing the PNT data and/or a flight plan to the flight control system 308 and/or the ground control station via communication system 310. The PNT data ensures that the operator and/or the UAV knows the UAV's current position at any given time. The flight plan ensures that the UAV knows its destination relative to its current position which is useful especially in autonomous aircraft applications.

The sensor(s) 304 can include, but are not limited to, a LiDAR system, a radar system, a sonar system, a camera, a locator (e.g., GPS device), an altitude sensor, and/or an eLORAN device. It should be noted that the locator of internal circuit 128 does provide information that facilitate the operator's 108 in determining the location of the UAV. However, this location is only available to the operator 108 and not the users 106, 124. Thus, this locator does not provide the users 106, 124 with any SA.

The communication system 310 provides a means to transmit PTN data and/or other information to the ground control station, and to receive command and control information from the ground control station. The command and control information is passed from the communication system 310 to the computing device 302 and/or the flight control system 308. The flight control system 308 controls operations of the engine 306, elevator/flaps/aileron/rudders 314, and/or landing gear 316 in accordance with the commands and control information received from the ground control station.

The components 302-310, 314, 316 are supplied power from a main power source 312. The main power source 312 can include, but is not limited to, a battery and/or an energy harvesting circuit (e.g., comprising a super capacitor to store harvested energy from heat, wind, light, RF signals, etc.). The power is supplied from the main power source 312 to components 302-310 via a power bus 326.

The communication relay 126 is independent from the internal circuit 128 and consists a standalone payload for the UAV. As such, the communication relay 126 is provided with another power source 326 such that it is not supplied power from the main power source 312 of the UAV via power bus 326. Power source 326 can include, but is not limited to, a battery (e.g., a Lithium Polymer (LiPo) battery) and/or an energy harvesting circuit. Such a power source arrangement ensures that the components 322, 324 of the communication relay 126 continue to operate when the internal circuit 128 is no longer being supplied power from the main power source 312. The components include a radio 322 and a locator 324. The locator 324 can include, but is not limited to, a GPS device. Notably, the locator 324 provides a means to allow all users 106, 124 in a communication relay link to know the location of the UAV at any given time, and therefore provides these users with additional SA information. Antennas 320, 328 are respectively provided for the radio 322 and locator 324.

Figure 4:
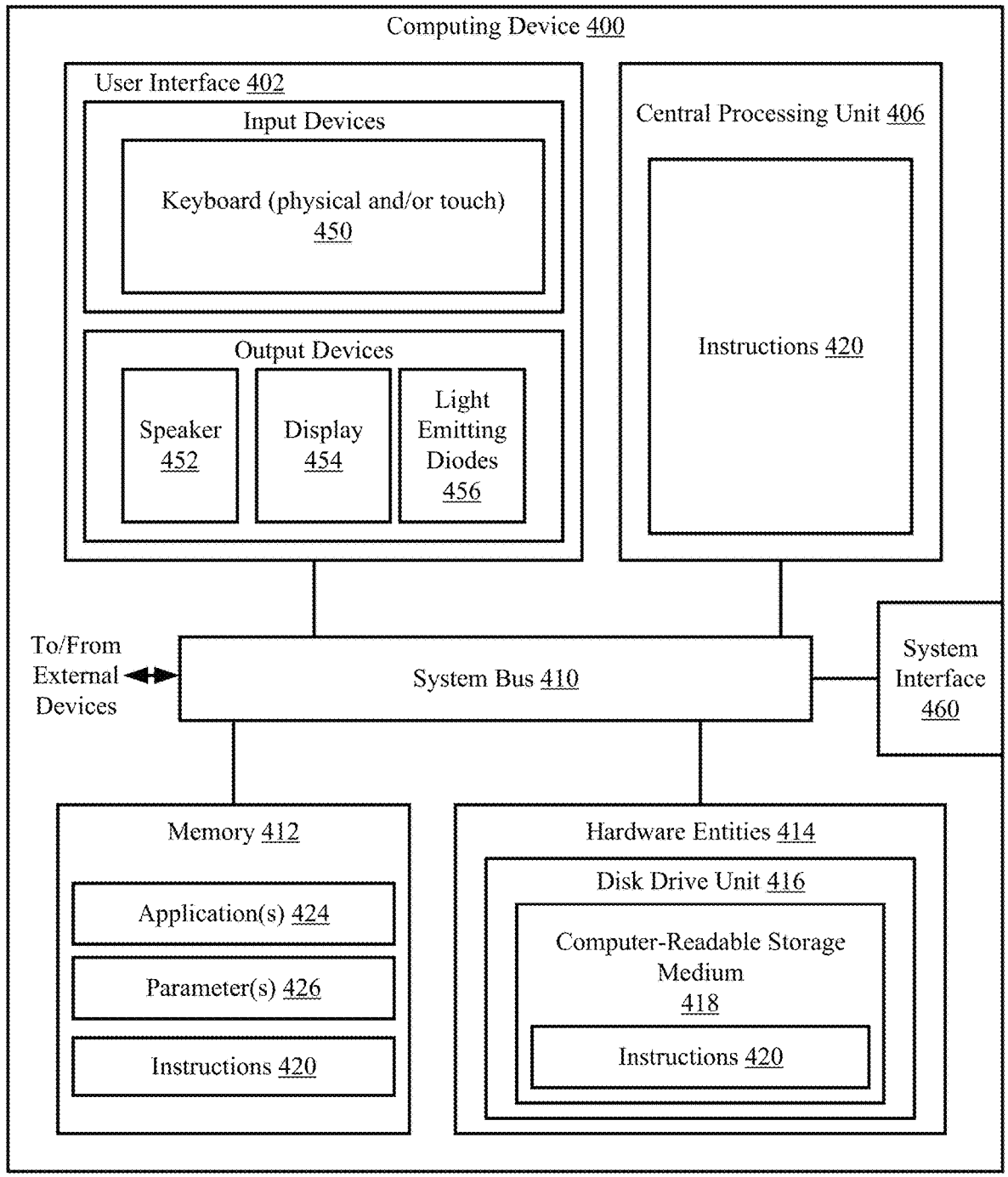
FIG. 4 provides a block diagram of an illustrative architecture for a computing device.

Referring now to FIG. 4, there is shown an illustrative architecture for a computing device 400. The communication unit(s) 104 of FIG. 1, ground control station 110 of FIG. 1, server 118 of FIG. 1, computing device(s) 122 of FIG. 1 and/or computing device 302 of FIG. 3 is/are the same as or similar to computing device 400. As such, the discussion of computing device 400 is sufficient for understanding the components 104, 110, 118, 122 of FIG. 1 and computing device 302 of FIG. 3.

Computing device 400 may include more or less components than those shown in FIG. 4. However, the components shown are sufficient to disclose an illustrative solution implementing the present solution. The hardware architecture of FIG. 4 represents one implementation of a representative computing device configured to receive information, process the receive information, transmit information and/or control operations of a UAV, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit (CPU) 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
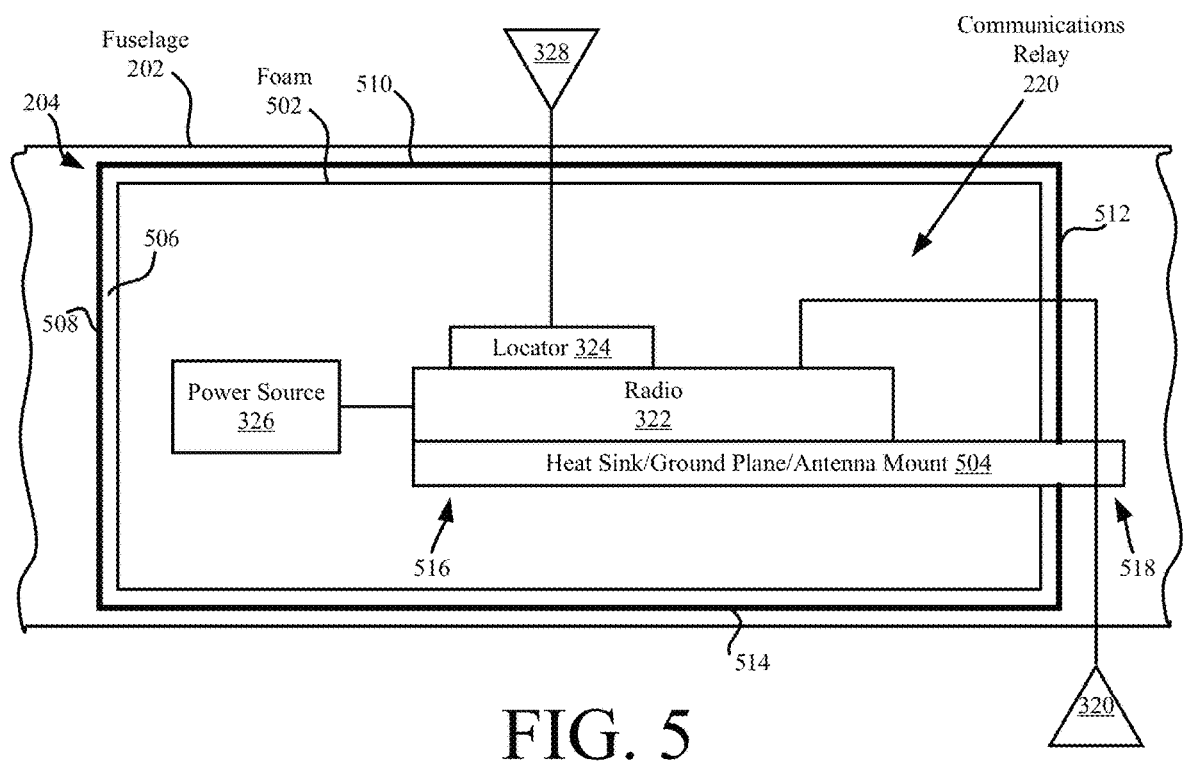
FIGS. 5-6 each provide an illustration that is useful for understanding how a communications relay is disposed in a fuselage of an UAV.
Figure 6:
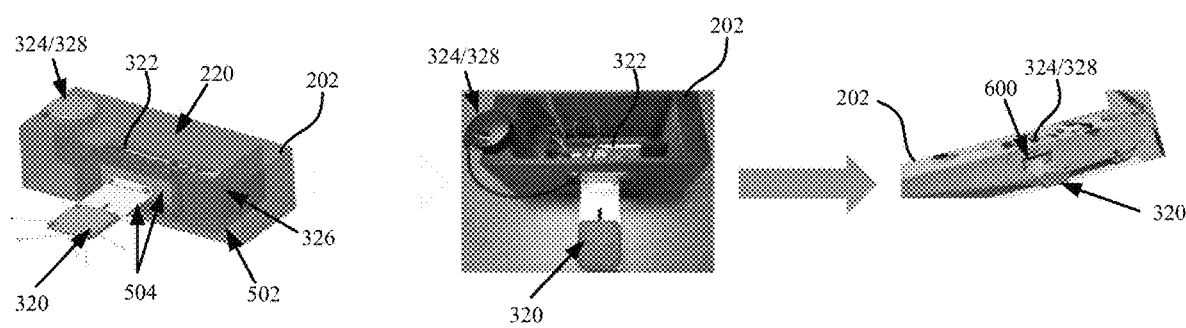

Referring now to FIGS. 5-6, there are provided illustrations that are useful for understanding how the communication relay 220 is disposed in the UAV 102 without causing any modifications to the fuselage 202. One or more cavities 204 are provided in the fuselage 202 and are accessible to a user via, for example, an access means (e.g., a door, a removable plate or a removable panel). The cavity 204 can have a generally rectangular shape defined by a bottom wall 506, sidewalls 508, 510, 512, 514 and the access means (not shown).

Foam 502 is provided on all sides of the cavity (bottom, sides and top) so as to encompass the communication relay 220. The foam 502 is provided to: (i) prevent any damage to the communication relay 220 due to shock (e.g., due to UAV landing), vibration and/or external forces being applied to the UAV (e.g., as a result of being dropped and/or crashing into the ground or other object); and (ii) prevent damage to the fuselage 202 by the communication relay 220 in the event of a UAV crash or other event which causes the communication relay 220 to move within the UAV. Thus, the foam 502 can comprise a plurality of foam sheets (e.g., six foam sheets—one for the top, bottom and four sidewalls), a foam sleeve, or a foam box with a foam lid/cover. The communication relay 220 can be encompassed by the foam (e.g., via insertion to the foam box) prior to being inserted into cavity 204. Once inserted, the cavity is sealed, for example, by closing the door or re-coupling the plate/panel to the fuselage 202 (e.g., via screws, latches or snaps). The foam is selected in accordance with a given application for ensuring that the communication relay 220 is not damaged upon impact or application of force to the UAV.

The foam 502 also facilitates installation of the communication relay 220 in the UAV without requiring modification (e.g., the drilling of mounting holes) to the fuselage 202. The foam 502 provides a compression or friction fit to join the communication relay 220 and the fuselage 202. The compression or friction fit ensures that the communication relay 220 does not move relative to the fuselage 202 during flight.

A component 504 is coupled to the communication relay 220 prior to being inserted into the fuselage. The component 504 provides a heat sink to transfer heat generated by the communication relay 220 to an environment surrounding the UAV, a ground plane for the radio 322, and an antenna mount for the radio antenna 320. Notably, the radio antenna 320 is located outside of the fuselage 202. In this regard, the component 504 extends from inside the cavity (compartment or bay) 204 through an aperture 600 formed in the fuselage 202 to a surrounding environment. Component 504 can include a single part (e.g., an L-bracket) or a plurality of parts (e.g., a planar plate and a plate with a flange) coupled to each other via couplers (e.g., screws or bolts) (as shown in FIG. 6). In both cases, the component comprises a proximal end 516 and a distal end 518. The radio antenna 320 is mounted on and structurally supported by the distal end 518 of the component 504. The distal end 518 and radio antenna 320 are located outside of the fuselage 202 when the communication relay 220 is installed in the UAV. In some scenarios, the radio antenna 320 is positioned to be to the side of or below the fuselage 202.

The antenna 328 of the locator 324 is also disposed outside of the UAV in a manner that does not require modification to its fuselage 202. For example, the antenna 328 is coupled to an external surface of the fuselage 202 via double sided Velcro or adhesive tape. The present solution is not limited in this regard. In some scenarios, antenna 328 is coupled to the top surface of the fuselage 202.

Figure 7:
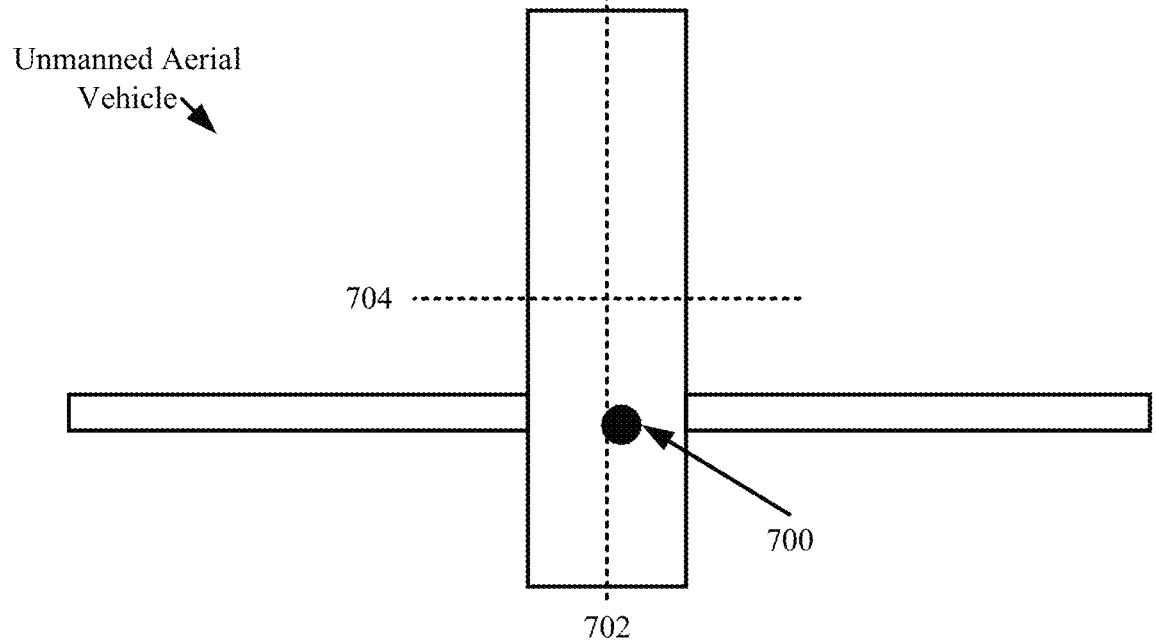
FIGS. 7-8 provide illustrations that are useful for understanding how a locator provided with a communications relay can be used to modify a Center of Gravity (CoG) of a UAV.
Figure 8:
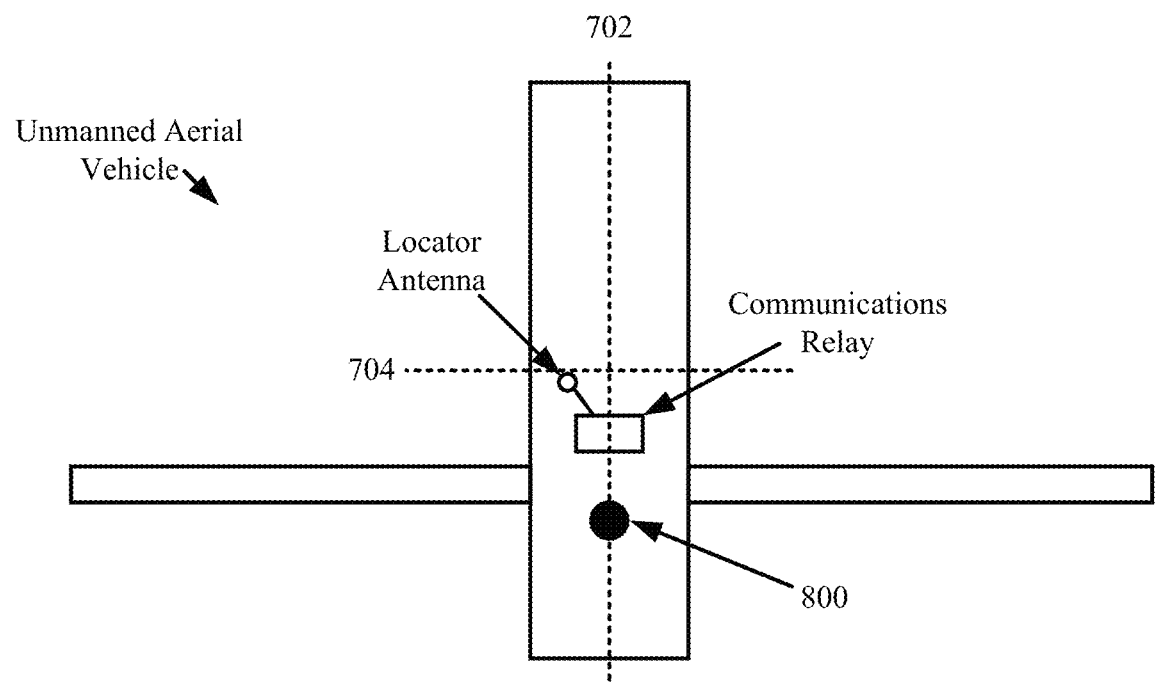

Referring now to FIGS. 7-8, there are provided illustrations that are useful for understanding how a locator (e.g., locator 324 of FIG. 3) provided with a communications relay can be used as a counter balance to correct the CoG of a UAV (e.g., UAV 102 of FIG. 1). The CoG can be changed by placing the antenna (e.g., antenna 328 of FIG. 3) of the locator on the fuselage (e.g., fuselage 202 of FIG. 2) so that a location 700 of the aircraft's CoG is modified or otherwise corrected. For example, the locator's antenna is disposed on the fuselage at a location that causes the UAV's CoG to move relative to a longitudinal axis 702 of the UAV and/or a lateral axis 704 of the UAV, whereby the CoG resides at a location 800 within allowable range/limits for flight.

Figure 9:
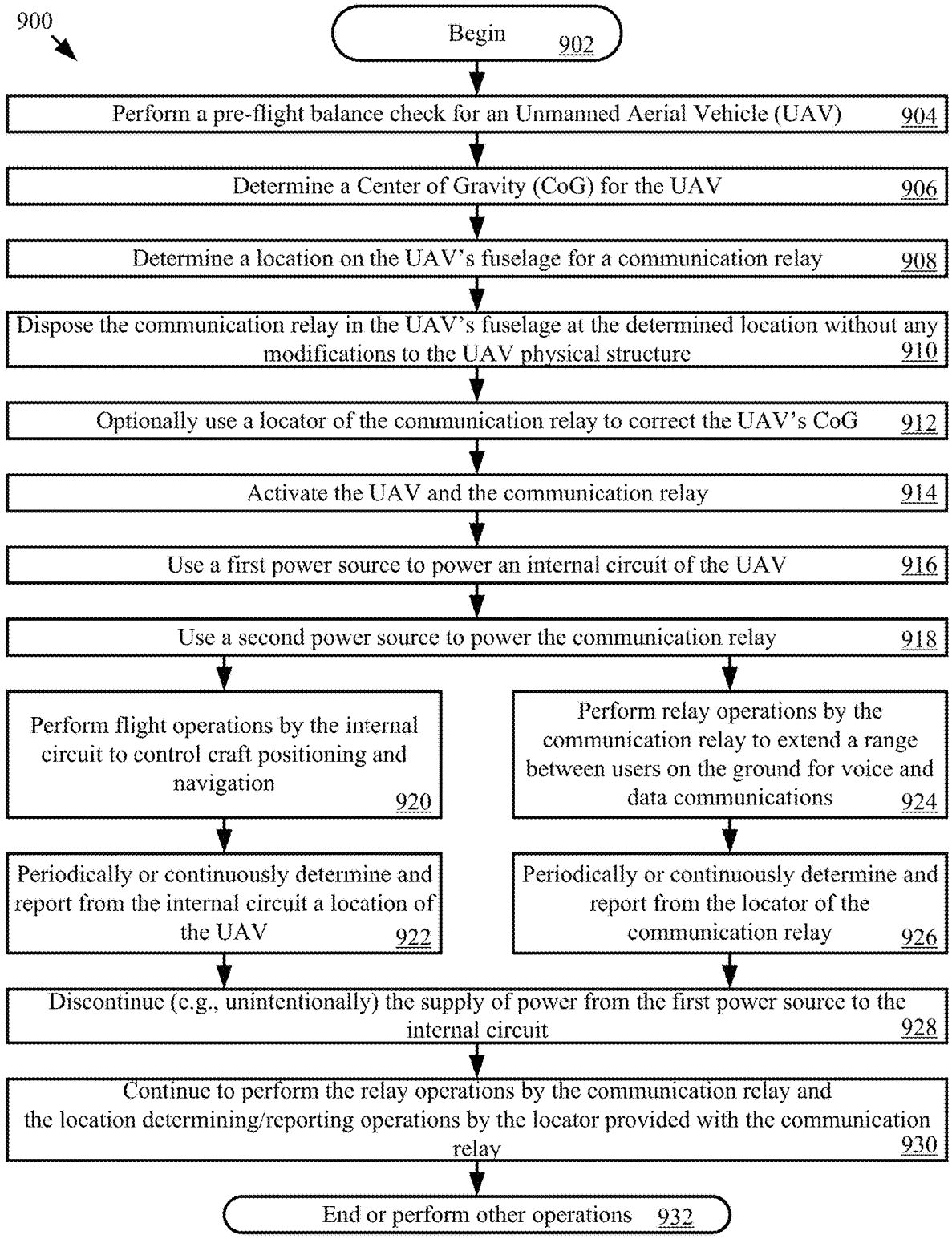
FIG. 9 provides a flow diagram of an illustrative method for operating a UAV and precisely locating the UAV when power is no longer being supplied thereto (e.g., to its navigation equipment).

Referring now to FIG. 9, there is provided a flow diagram of an illustrative method 900 for operating a UAV (e.g., UAV 102 of FIG. 1) and precisely locating the UAV when power is no longer being supplied thereto (e.g., to its navigation equipment). Method 900 begins with 902 and continues with 904 where a pre-flight balance check for the UAV is performed. The UAV's CoG is determined in 906 based on results of the pre-flight balance check. Next in 908, a location at which the communication relay (e.g., communication relay 126 of FIG. 1) is to be disposed in the UAV's fuselage (e.g., fuselage 202 of FIG. 2) is determined. For example, a determination is made that the communication relay is to be disposed in a particular cavity (compartment or bay) (e.g., cavity 204 of FIG. 2) of the fuselage. The communication relay is then disposed at the determined location without any modifications to the UAV's physical structure, as shown by 910. This can be achieved, for example, using foam (e.g., foam 502 of FIG. 5) to create a compression or friction fit between the communication relay and the fuselage.

In 912, the locator (e.g., locator 324 of FIG. 3) of the communication relay is optionally used to correct the UAV's CoG. For example, an antenna (e.g., antenna 328 of FIG. 3) of the locator is coupled to an external surface of the fuselage that causes the UAV's CoG to move relative to a longitudinal axis (e.g., axis 702 of FIG.) of the UAV and/or a lateral axis (e.g., axis 704 of FIG. 7) of the UAV.

In 914, the UAV and the communication relay are activated (e.g., turned on). A first power source (e.g., main power source 312 of FIG. 3) is used in 916 to power an internal circuit (e.g., internal circuit 128 of FIG. 1) of the UAV. A second power source (e.g., power source 326 of FIG. 3) is used in 918 to power the communication relay. Thereafter, method 900 continues with 920-922 and 924-926. Operations 920-922 and operations 924-926 are performed in parallel or concurrently as shown in FIG. 9.

Operations 920-922 involve: performing flight operations by the internal circuit of the UAV to control craft positioning and navigation; and periodically or continuously determining and reporting a location of the UAV from the internal circuit to a ground control station. Operations 924-926 involve: performing relay operations by the communication relay to extend a range between users on the ground for voice and data communications; and periodically or continuously determining and reporting a location of the UAV from the locator provided with the communication relay to users in a communication relay link.

In some scenarios, the supply of power may be discontinued (e.g., unintentionally) from the first power source to the internal circuit of the UAV as shown by 928. When this happens, the sensor(s) (e.g., sensor(s) 304 of FIG. 3) of the internal circuit will no longer periodically or continuously determine and report the location of the UAV to the ground control station. However, the communication relay will continue to perform the relay operations. The locator provided therewith will also continue to perform the location determining/reporting operations, as shown by 930. In this way, the UAV can be located more quickly when crashed or otherwise unintentionally landed as compared to the time it takes for a conventional UAV to be located in similar situations. Subsequently, 932 is performed where method 900 ends or other operations are performed.

Figure 10:
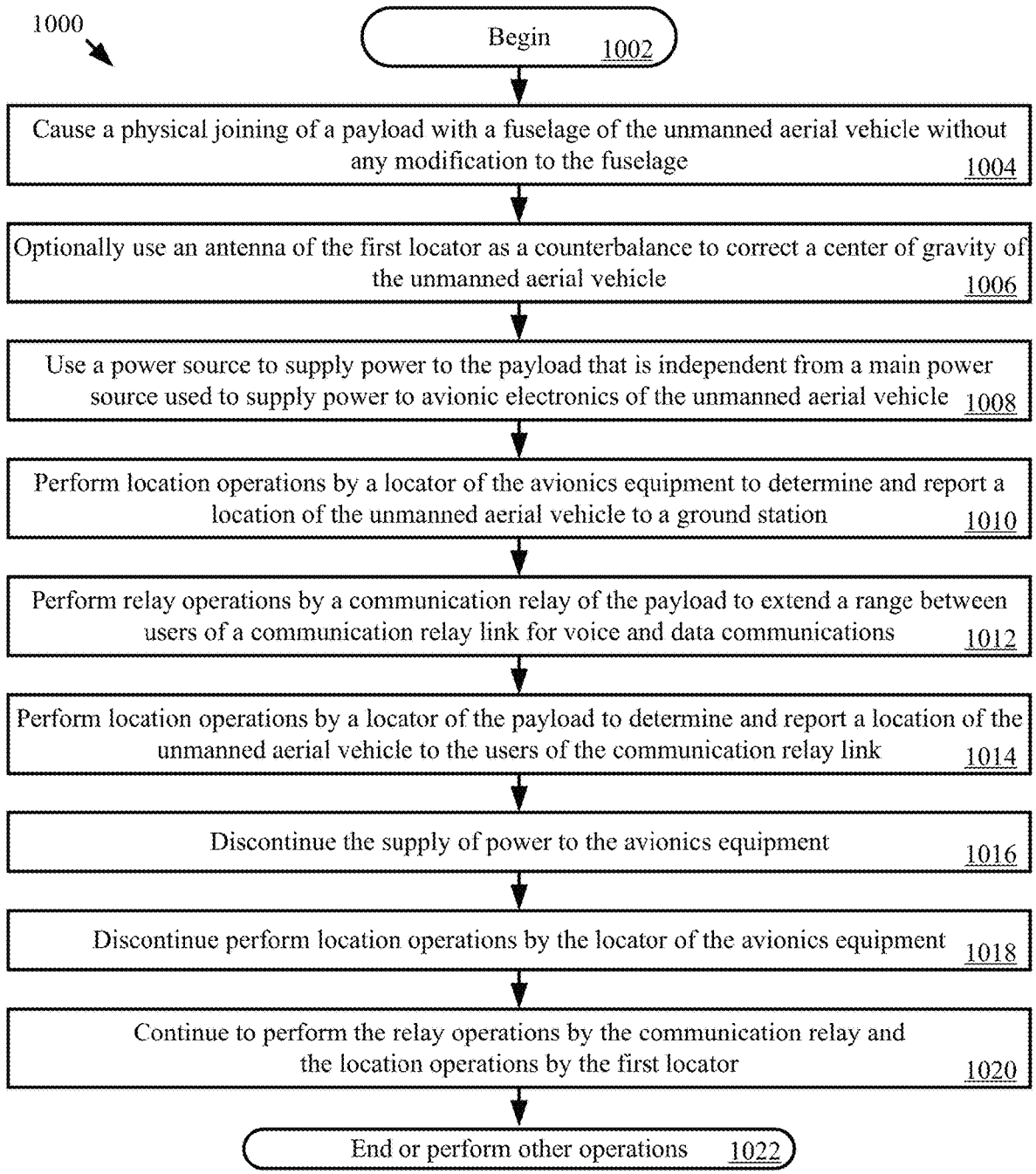
FIG. 10 provides a flow diagram of an illustrative method for operating and/or locating a UAV.

Referring now to FIG. 10, there is shown a flow diagram of an illustrative method 1000 for operating and/or locating a UAV (e.g., UAV 102 of FIG. 1). Method 1000 begins with 1002 and continues with 1004 where a payload is physically joined with a fuselage (e.g., fuselage 202 of FIG. 2) of the UAV without any modification to the fuselage. The payload may be physically joined with the fuselage via a compression fit or a frictional fit in a cavity (e.g., cavity 204 of FIG. 2) of the UAV. Foam (e.g., foam 502 of FIG. 5) may be used to physically join the payload with the fuselage without any modification to the fuselage. The foam may also be used protect the payload from damage due to shock and vibration.

The payload comprises a communication relay (e.g., communication relay 126 of FIG. 1 with a radio 322 of FIG. 3) and a locator (e.g., locator 324 of FIG. 3). The communication relay is configured to perform relay operations to extend a range between users (e.g., users 106, 124 of FIG. 1) of a communication relay link (e.g., link 116 of FIG. 1) for voice and data communications. An antenna (e.g., antenna 320 of FIG. 3) of the communication relay resides outside of the fuselage when the payload is physically joined with the fuselage.

The locator is configured to perform location operations to determine and report a location of the UAV to the users of the communication relay link. An antenna (e.g., antenna 328 of FIG. 3) of the locator may be used as a counterbalance to correct the UAV's CoG, as shown by 1006. In this regard, the antenna may be attached to an exterior surface of the fuselage at a particular location for providing the counterbalance. This attachment may be performed without any modification to the fuselage.

A power source (e.g., power source 326 of FIG. 3) is used in 1008 to supply power to the payload. The power source is independent from a main power source (e.g., main power source 312 of FIG. 3) used to supply power to avionic electronics of the UAV. In 1010, a locator (e.g., sensor 304 of FIG. 3) of the avionics equipment performs operations to determine and report a location of the UAV to a ground station (e.g., ground station 110 of FIG. 1). In 1012, relay operations are performed by the communication relay of the payload to extend a range between users of the communication relay link for voice and data communications. In 1014, location operations are performed by a locator of the payload to determine and report a location of the UAV to the users of the communication relay link.

In 1016, the supply of power from the main power source to the avionics equipment is discontinued (e.g., unintentionally). When this occurs, the locator of the avionics equipment discontinues its performance of the location operations as shown by 1018. However, the relay operations by the communication relay and the location operations by the first locator continue to be performed as shown 1020. Subsequently, 1022 is performed where method 1000 ends or other operations are performed.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for locating an unmanned aerial vehicle, comprising:
    causing a physical joining of a payload with a fuselage of the unmanned aerial vehicle without any modification to the fuselage, the payload comprising a communication relay configured to perform relay operations to extend a range between users of a communication relay link for voice and data communications and a first locator configured to perform location operations to determine and report a location of the unmanned aerial vehicle to the users of the communication relay link;
    using a power source to supply power to the payload that is independent from a main power source used to supply power to avionic electronics of the unmanned aerial vehicle; and
    continuing to perform the relay operations by the communication relay and the location operations by the first locator, when power is no longer being supplied to the avionic electronics by the main power source of the unmanned aerial vehicle.

2. The method according to claim 1, wherein the payload is physically joined with the fuselage via a compression fit or a frictional fit in a cavity of the unmanned aerial vehicle.

3. The method according to claim 1, further comprising using foam to physically join the payload with the fuselage without any modification to the fuselage.

4. The method according to claim 3, further comprising using the foam to also protect the payload from damage due to shock and vibration.

5. The method according to claim 1, further comprising determining a location for a center of gravity of the unmanned aerial vehicle.

6. The method according to claim 5, further comprising using an antenna of the first locator as a counterbalance to correct the center of gravity.

7. The method according to claim 6, wherein the antenna of the first locator is attached to an exterior surface of the fuselage without any modification to the fuselage.

8. The method according to claim 1, wherein an antenna of the communication relay resides outside of the fuselage when the payload is physically joined with the fuselage.

9. The method according to claim 1, further comprising performing operations by a second locator of the avionic electronics to detect and report the location of the unmanned aerial vehicle to a ground control station while the main power source is supplying power to the avionic electronics and while the first locator is reporting the location of the unmanned aerial vehicle to the users of the communication relay link.

10. The method according to claim 9, further comprising discontinuing performance of the operations by the second locator when power is no longer being supplied to the avionic electronics by the main power source of the unmanned aerial vehicle.

11. The system according to claim 10, wherein an antenna of the communication relay resides outside of the fuselage when the payload is physically joined with the fuselage.

12. The system according to claim 10, wherein the avionic electronics comprise a second locator configured to detect and report the location of the unmanned aerial vehicle to a ground control station while the main power source is supplying power to the avionic electronics and while the first locator is reporting the location of the unmanned aerial vehicle to the users of the communication relay link.

13. The system according to claim 12, wherein the second locator discontinues performance of the operations when power is no longer being supplied to the avionic electronics by the main power source of the unmanned aerial vehicle.

14. The system according to claim 10, wherein the unmanned aerial vehicle is sized and shaped to fit inside a bag that can be carried by an individual.

15. An unmanned aerial vehicle, comprising:
a fuselage;
avionic electronics disposed in the fuselage;
a payload physical joined with the fuselage without any modification to the fuselage, the payload comprising
    a communication relay configured to perform relay operations to extend a range between users of a communication relay link for voice and data communications, and
    a first locator configured to perform location operations to determine and report a location of the unmanned aerial vehicle to the users of the communication relay link;
a first power source configured to supply power to the avionic electronics; and
a second power source configured to supply power to the payload, the second power source being separate and apart from the main power source;
wherein the relay operations and the location operations continue to be performed by the payload when power is no longer being supplied to the avionic electronics by the main power source.

16. The system according to claim 15, wherein the payload is physically joined with the fuselage via a compression fit or a frictional fit in a cavity of the unmanned aerial vehicle.

17. The system according to claim 15, wherein foam is used to physically join the payload with the fuselage without any modification to the fuselage.

18. The system according to claim 17, wherein the foam is also used to protect the payload from damage due to shock and vibration.

19. The system according to claim 15, wherein an antenna of the first locator is used as a counterbalance to correct a center of gravity of the unmanned aerial vehicle.

20. The system according to claim 19, wherein the antenna of the first locator is attached to an exterior surface of the fuselage without any modification to the fuselage.

* * * * *